US009113385B2

(12) United States Patent
Pettersson et al.

(10) Patent No.: US 9,113,385 B2
(45) Date of Patent: Aug. 18, 2015

(54) METHOD AND ARRANGEMENTS FOR REDUCING THE NUMBER OF FAILED HANDOVER PROCEDURES

(75) Inventors: Jonas Pettersson, Luleå (SE); Kristofer Sandlund, Luleå (SE); Ylva Timner, Luleå (SE); Min Wang, Luleå (SE); Mats Wernersson, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 519 days.

(21) Appl. No.: 13/511,278

(22) PCT Filed: Nov. 25, 2009

(86) PCT No.: PCT/SE2009/051333
§ 371 (c)(1),
(2), (4) Date: May 22, 2012

(87) PCT Pub. No.: WO2011/065874
PCT Pub. Date: Jun. 3, 2011

(65) Prior Publication Data
US 2012/0230219 A1    Sep. 13, 2012

(51) Int. Cl.
*H04W 36/30* (2009.01)
*H04W 36/24* (2009.01)
*H04W 36/00* (2009.01)

(52) U.S. Cl.
CPC .......... *H04W 36/24* (2013.01); *H04W 36/0055* (2013.01)

(58) Field of Classification Search
CPC . H04W 36/08; H04W 36/0072; H04W 36/30; H04W 36/0083; H04W 36/0061
USPC ........................... 370/252, 331; 455/436, 437
See application file for complete search history.

(56) References Cited

U.S. PATENT DOCUMENTS 7,831,273 B2 * 11/2010 Suonvieri ................ 455/522
8,520,540 B1 *  8/2013 Foschiano et al. ......... 370/252
(Continued)

FOREIGN PATENT DOCUMENTS

| EP | 2077688 A2 | 7/2009 |
| WO | 2008/000914 A1 | 1/2008 |
| WO | 2009/022860 A1 | 2/2009 |
| WO | 2010/057128 A1 | 5/2010 |

OTHER PUBLICATIONS

3rd Generation Partnership Project. "Intra-Frequency Measurement Reporting Events." 3GPP TSG RAN WG2 #60, R2-074962, Jeju, Korea, Nov. 5-9, 2007.

(Continued)

*Primary Examiner* — Jamal Javaid
(74) *Attorney, Agent, or Firm* — Murphy, Bilak & Homiller, PLLC

(57) ABSTRACT

The invention relates to a method in a source radio base station (14) for enabling a handover of a connection to a user equipment (13) from a source cell (11) to a target cell (17). The source radio base station (14) serves the source cell (11) and is comprised in a radio communications network (100). The source radio base station receives (802) at least a first segment of a measurement report from the user equipment (13), which measurement report indicates received signal power of signals of neighboring cells. The source radio base station then determines (803) a transmission time of the segment of the measurement report and compares (804) the transmission time with a predefined time threshold value. When the transmission time has exceeded the time threshold value, the source radio base station determines (806) whether to perform the handover based on the at least first segment of the measurement report.

11 Claims, 11 Drawing Sheets

(56) References Cited

U.S. PATENT DOCUMENTS

2003/0086395 A1* 5/2003 Shanbhag ................. 370/331
2007/0047493 A1 3/2007 Park et al.
2008/0220784 A1 9/2008 Somasundaram et al.
2010/0029280 A1* 2/2010 Tenny et al. ................. 455/436

OTHER PUBLICATIONS

3GPP, "3rd Generation Partnership Project; Technical Specification Group Radio Access Network; Evolved Universal Terrestrial Radio Access (E-UTRA) Radio Resource Control (RRC); Protocol specification (Release 8)", 3GPP TS 36.331 V8.5.0, Mar. 2009, 1-204.

3GPP, "3rd Generation Partnership Project; Technical Specification Group Radio Access Network; Evolved Universal Terrestrial Radio Access (E-UTRA); LTE Physical Layer—General Description (Release 8)", 3GPP TS 36.201 V8.1.0, Nov. 2007, 1-13.

Dimou, Konstantinos, et al., "Handover within 3GPP LTE: Design Principles and Performance", IEEE 2009, 2009, 1-5.

* cited by examiner

METHOD AND ARRANGEMENTS FOR REDUCING THE NUMBER OF FAILED HANDOVER PROCEDURES

TECHNICAL FIELD

The invention relates to a radio base station, a method in a radio base station, a user equipment and a method in a user equipment. In particular, it relates to enable a handover of a connection to the user equipment from a source cell to a target cell.

BACKGROUND

The objective of the 3GPP Long Term Evolution (LTE) is to provide enhanced performance in terms of higher data rates, reduced delays, improved coverage, e.g. the percentage of a network service area that upholds a required communication quality, and capacity, e.g. the maximum amount of data that can be transmitted over a channel. The downlink air interface is Orthogonal Frequency-Division Multiple Access (OFDMA) based, while Single Carrier FDMA (SC-FDMA) will be employed in the uplink. The downlink scheduler and uplink scheduler at the base station side performs the resource allocation for users.

When data is available at the transmit buffers of a user equipment (UE), and the user equipment has no grant for transmission on a Physical Uplink Shared Channel (PUSCH), the user equipment need to request permission to transmit. A Scheduling Request (SR) will either be transmitted on the Random Access Channel (RACH), denoted as RA-SR, or on dedicated resources on the Physical Uplink Control Channel (PUCCH), denoted as D-SR. The Uplink (UL) scheduler monitors the users' requests and distributes the available resources among the users.

At the user equipment side, there are multiple priority queues for different services. Each priority queue has a specific priority, and is valid for one service. Commonly, Radio Resource Control (RRC) signaling may be served with highest priority both in uplink and downlink. Measurement results of received signal power for both a source cell serving the user equipment and also neighbouring cells are reported from the user equipment to the radio base station side periodically or when a handover event is triggered. When a user equipment moves to the cell edge and the radio channel quality of the source cell is several dB lower than the radio channel quality from the strongest neighbouring cell for a time-to-trigger interval, a Handover (HO) event will be triggered. The radio base station will make a handover decision and send a handover command to the user equipment. The user equipment then tries to reach the target cell and do a handover. When the handover procedure is ready, the user equipment responds to the radio base station with a handover confirm message.

Handover related signaling has strict delay requirements, such as for example RRC signaling. If one of the handover messages is transmitted with too long delay, the handover may fail. This failure may cause the user equipment to remain connected to a non-optimal cell, and may have a great negative effect on the service performance perceived by the user.

SUMMARY

There is an object of embodiments herein to provide a mechanism that improves the service performance of a user equipment.

The object is achieved by providing a method in a source radio base station for enabling a handover of a connection to a user equipment from a source cell to a target cell. The source radio base station serves the source cell and is comprised in a radio communications network. The source radio base station receives at least a first segment of a measurement report from the user equipment. The measurement report indicates received signal power of signals of neighbouring cells. Furthermore, the source radio base station determines a transmission time of the segment of the measurement report and compares the transmission time with a predefined time threshold value. When the transmission time has exceeded the time threshold value, the source radio base station determines whether to perform the handover based on the at least first segment of the measurement report.

In order to perform the method an arrangement in the source radio base station is provided. The arrangement comprises a receiving circuit arranged to receive the at least first segment of the measurement report from the user equipment. The arrangement further comprises a determining circuit arranged to determine the transmission time of the segment of the measurement report and a comparing circuit arranged to compare the transmission time of the segment with the predefined time threshold value. The determining circuit is arranged to determine whether to perform the handover based on the at least first segment of the measurement report when the time interval has exceeded the time threshold value.

According to another aspect the object is achieved by providing a method in the user equipment. The user equipment is present in the source cell served by the source radio base station in the radio communications network. The user equipment receives a first signal of a first neighbouring cell, a second signal of a second neighbouring cell and a third signal of the source cell, the third signal coming from the source radio base station. The user equipment measures a first received signal power of the first signal, a second received signal power of the second signal of the respective neighbouring cell, and also a received signal power of the third signal of the source cell. The measured received signal power of the second signal is stronger than the measured received signal power of the first signal. The user equipment compares the measured received signal power of the first signal with the measured received signal power of the second signal, and determines that, based on the comparison; a strongest received signal power is represented by the measured received signal power of the second signal. The user equipment then reports the measured received signal powers in a segmented measurement report to the source radio base station, wherein the measurement report comprises a header and a first part placed directly after the header in the measurement report. The first part comprises the measured received signal power of the third signal, the determined strongest received signal power and an identity of the second neighbouring cell of the strongest received signal power. Also, the first part is placed before a second part, which second part comprises the first neighbouring cell identity and the measured received signal power of the first signal. The measurement report is to be used by the source radio base station to determine whether the target cell is represented by the second neighbouring cell and whether to perform a handover to the target cell.

In order to perform the method an arrangement in the user equipment is provided. The arrangement comprises a receiving circuit arranged to receive the first signal of the first neighbouring cell, a second signal of the second neighbouring cell, and the third signal of the source cell. The arrangement further comprises a measuring circuit arranged to measure the received signal power of the first signal, the received signal power of second signal of the respective neighbouring cell, and the received signal power of the third signal of the source cell. The arrangement also comprises a comparing circuit arranged to compare the measured received signal power of the first signal with the measured received signal power of the second signal, and a determining circuit arranged to determine that, based on the comparison, a strongest received signal power is represented by the measured received signal power of the second signal. The arrangement comprises a reporting circuit arranged to report the measured received signal powers in the segmented measurement report to the source radio base station structured as above.

By providing a source radio base station that determines whether to perform a handover even if the whole measurement report has not been received the number of failed handover procedures will be reduced. In addition, this is possible and improved by letting the user equipment report the best neighboring cell measurement in the beginning of the measurement report.

BRIEF DESCRIPTION OF THE DRAWINGS

Embodiments will now be described in more detail in relation to the enclosed drawings, in which.

DETAILED DESCRIPTION

Figure 1:
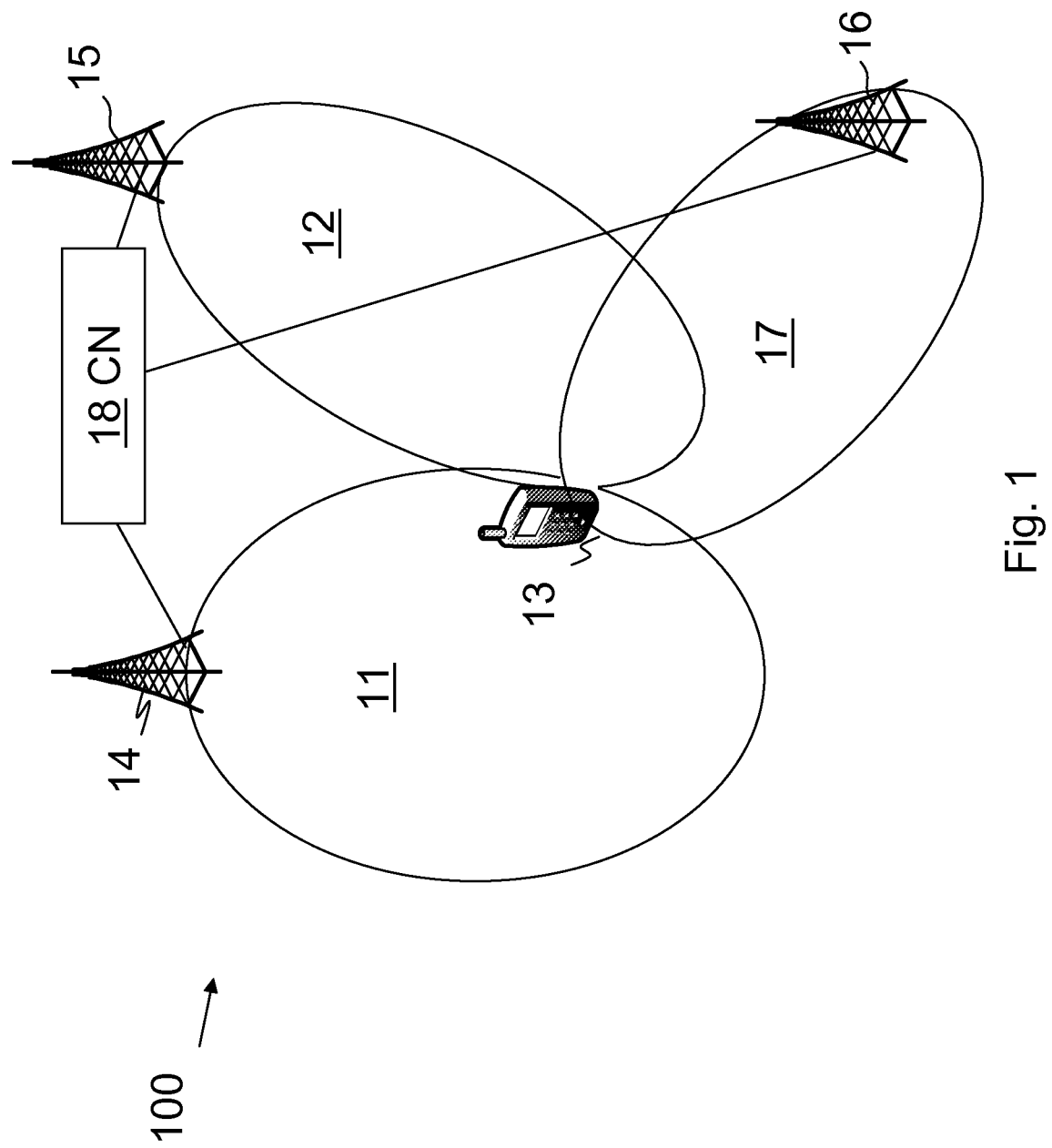
FIG. 1 is a schematic diagram depicting a radio communications network.

FIG. 1 shows an example of a radio communications network 100 in which the present invention is suitably applied. As shown, the radio communications network 100 is a cellular system and comprises a number of cells, where of one is shown as a source cell 11 and one as a first neighbouring cell 12 in FIG. 1. Each cell may comprise a number of user equipments, with the generic name "UE". One user equipment is shown as a user equipment 13 served by the source cell 11.

For each cell in the radio communications network 100, there is a controlling node, generically referred to as a "radio base station", RBS. The radio communications network 100 may comprise an LTE network as well as other networks such as GSM, UMTS, or the like. An RBS may be denoted as NodeB or evolved NodeB in some of the networks. Herein the solution will be exemplified in an LTE network and the radio base station will be referred to as radio base station.

A source radio base station 14, controls the source cell 11 and a first neighbouring radio base station 15, controls the first neighbouring cell 12. One role of the source radio base station 14 is that all traffic to and from the user equipment 13 in the source cell 11 is routed via the source radio base station 14. As the user equipment 13 is served by the source radio base station 14 it receives a signal that, for example, comprises broadcasted system information or the like, from the source radio base station 14 and measures the received signal power of the signal. When the user equipment 13 moves closer to the edge of the source cell 11 and into the coverage of the first neighbouring radio base station 15 the user equipment 13 receives a signal that, for example, comprises broadcasted system information or the like, from the first neighbouring radio base station 15. The user equipment 13 measures the received signal power of the signal.

In the illustrated example, a second neighbouring radio base station 16 serving a second neighbouring cell 17 is disclosed. The radio base stations are connected to a core network (CN) 18. The user equipment 13 also receives a signal that, for example, comprises broadcasted system information or the like, from the second neighbouring radio base station 16. The user equipment 13 measures the received signal power of the signal.

Both a source cell measurement result and the first and second neighbouring cell measurement results are reported from the user equipment 13 to the source radio base station 14, for example, periodically, in a measurement report, also called handover measurement report message. When the user equipment 13 moves to the cell edge of the source cell 11 and the radio channel quality of the source cell 11 is several dB lower than the radio channel quality the second neighbouring cell 17 for a time to trigger interval, a Handover (HO) event will be triggered. According to some present embodiments herein, the measurement report may comprise a header indicating type of message and a first part placed directly after the header. The first part may further comprise a measured power value associated to the source cell 11, followed by a neighbouring cell identity with the strongest received signal power and also a measured power value associated to the neighbouring cell with the strongest received signal power, a so called best cell measurement. The measurement report may further comprise a second part placed subsequently to the first part. The second part comprises a neighbouring cell identity with the weaker received signal power and also a measured power value associated to the neighbouring cell with the weaker received signal power. The measurement report may be divided into one or more segments, depending on the size of the radio allocation and the amount of channel coding used, and transmitted one segment at a time to the source radio base station 14. Hence, the first part may end up in a first segment but if there is a lot of channel coding, there will be many segments, and possible the best cell measurement will end up in the second segment.

In the illustrated example, the signal from the second neighbouring cell 17 is stronger than the signal of the source cell 11 over a time interval of 1 second. The signal is also stronger than the signal from the first neighbouring radio base station 15. The user equipment 13 then sends a measurement report to the source radio base station 15 with a first part comprising a received power value of the source cell 11 followed by the identity of the second neghbouring cell 17 and the measured signal power value of the signal of the second neighbouring cell 17. According to some present embodiments herein the source radio base station 14 then makes a handover decision based on received segments that has been received within a determined transmission time and sends a handover command to the user equipment 13. The user equipment 13 then connects to the second neighbouring cell 17 and performs a handover. When the handover procedure finishes, the user equipment 13 responds to the second neighbouring radio base station 16 with a handover confirm message.

As part of the invention a problem will be identified and described in that once a transmission delay of a handover message transmission exceeds the delay requirements, the corresponding handover may fail. So, the guarantee for short handover signaling delay is very important. It has been shown that measurement report transmission failure is the main reason for handover failure in UL. There are several possible reasons why the measurement report transmission may require so long time.

One reason is that the measurement report is transmitted in the source cell 11 when the handover occurs and the radio channel quality in the source cell 11 is several dB lower than that of the second target cell 12.

Another reason is that uplink is much more resource limited than the downlink, especially in coverage limited scenarios. Furthermore, as an uplink scheduler does not have detailed user equipment buffer status information, the handover signalling RRC messages cannot always be scheduled with absolute priority in the uplink.

If delay efficient processing of measurement report can be guaranteed, handover performance can be improved.

Embodiments of the present solution provide a delay efficient processing procedure for measurement reports in uplink. When the transmission of a measurement report is delayed more than a predefined time threshold value, the handover module analyses the received segment or segments and decides whether to perform a handover procedure based on the received incomplete measurement report message. The predefined threshold value guarantees a high probability that the radio base station may receive the key information that is indispensable to perform a handover. This idea targets to resolve the problem caused by lost handover measurement report messages.

The source radio base station 14 makes a handover decision based on the received incomplete handover measurement report message, when needed. As mentioned above, the uplink has much more serious problem compared to the downlink. The reason that uplink signaling messages might require so long time to get through is because the uplink messages are often segmented into many segments during the transmission. When the handover measurement report transmission fails, there is still a high probability that at least one segment has been received. If the key information is put in the beginning of segments, as in some of the embodiments herein, it is even more probable that this may solve the problem. The key information comprises source cell measurement and a best neighbouring cell measurement and best cell identity.

In the illustrated example there is only two neighbour cells, but in a real network, there is typically many more.

Figure 2:
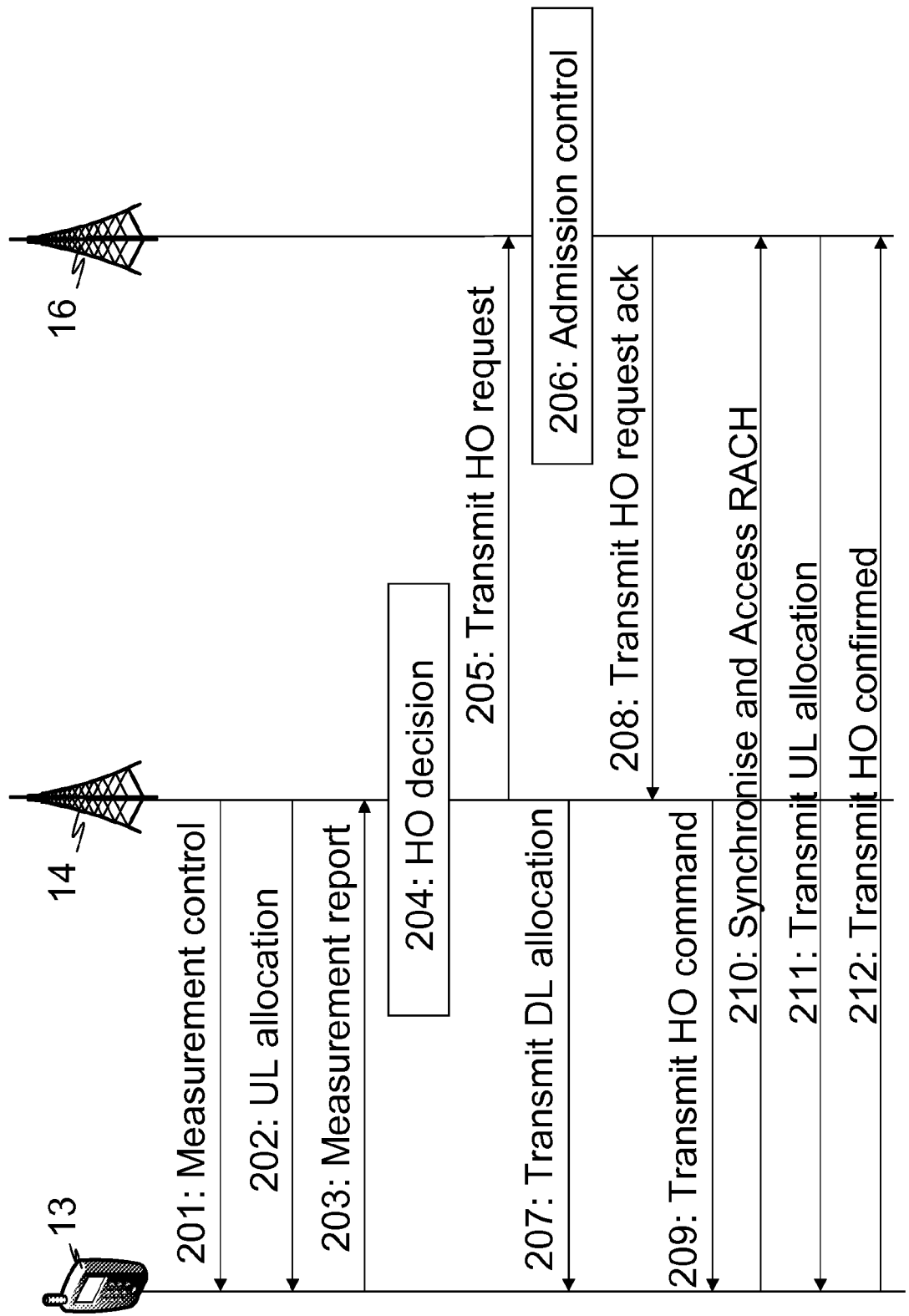
FIG. 2 is a combined signalling and flowchart depicting a handover procedure in a radio communications network.

FIG. 2 discloses a combined signalling and flowchart comprising embodiments of the present solution of a handover procedure in the radio communications network.

Step 201. The source radio base station 14 transmits a measurement control signal to the user equipment 13, which control signal indicates that the user equipment 13 will report signal measurements to the source radio base stations.

Step 202. The source radio base station 14 transmits allocation of uplink resources to the user equipment 13 in order for the user equipment to communicate to the source radio base station 14.

Step 203. The user equipment 13 receives signals from the source cell as well as from neighbouring cells. The user equipment 13 performs measurements on the received signals and reports in a measurement report to the source radio base station 14, the measured received signals. Embodiments of the structure of the measurement report are described in FIG. 3.

Step 204. The source radio base station 14 makes a handover decision based on the received measurement report from the user equipment 13, which decision relates in this example to performing a handover to the target base station 16. Embodiments herein disclose that the source radio base station 14 makes a handover decision based on the received incomplete handover measurement report message, when needed. If a determined delay time between the sent and received measurement report is still less than a predefined time threshold value, the source radio base station 14 waits for the other segments, or else, executes the handover procedure.

Step 205. The source radio base station 14 transmits a handover request to the target radio base station 16 decided from the measurement report.

Step 206. The target radio base station 16 performs an admission control of the user equipment 13.

Step 207. The source radio base station 14 also allocates downlink resources and transmits a downlink allocation to the user equipment 13.

Step 208. The target radio base station 16 transmits a handover request acknowledgement to the source radio base station 14.

Step 209. The source radio base station 14 transmits a handover command to the user equipment 13.

Step 210. The user equipment 13 synchronises and access random access channel (RACH) to the target radio base station 16.

Step 211. The target radio base station 16 transmits the uplink allocation to the user equipment 13.

Step 212. The user equipment 13 transmits a handover confirmed to the target radio base station 16.

Hence, the handover procedure is improved and consequently a mechanism is provided that improves the service performance of the user equipment 13.

Figure 3:
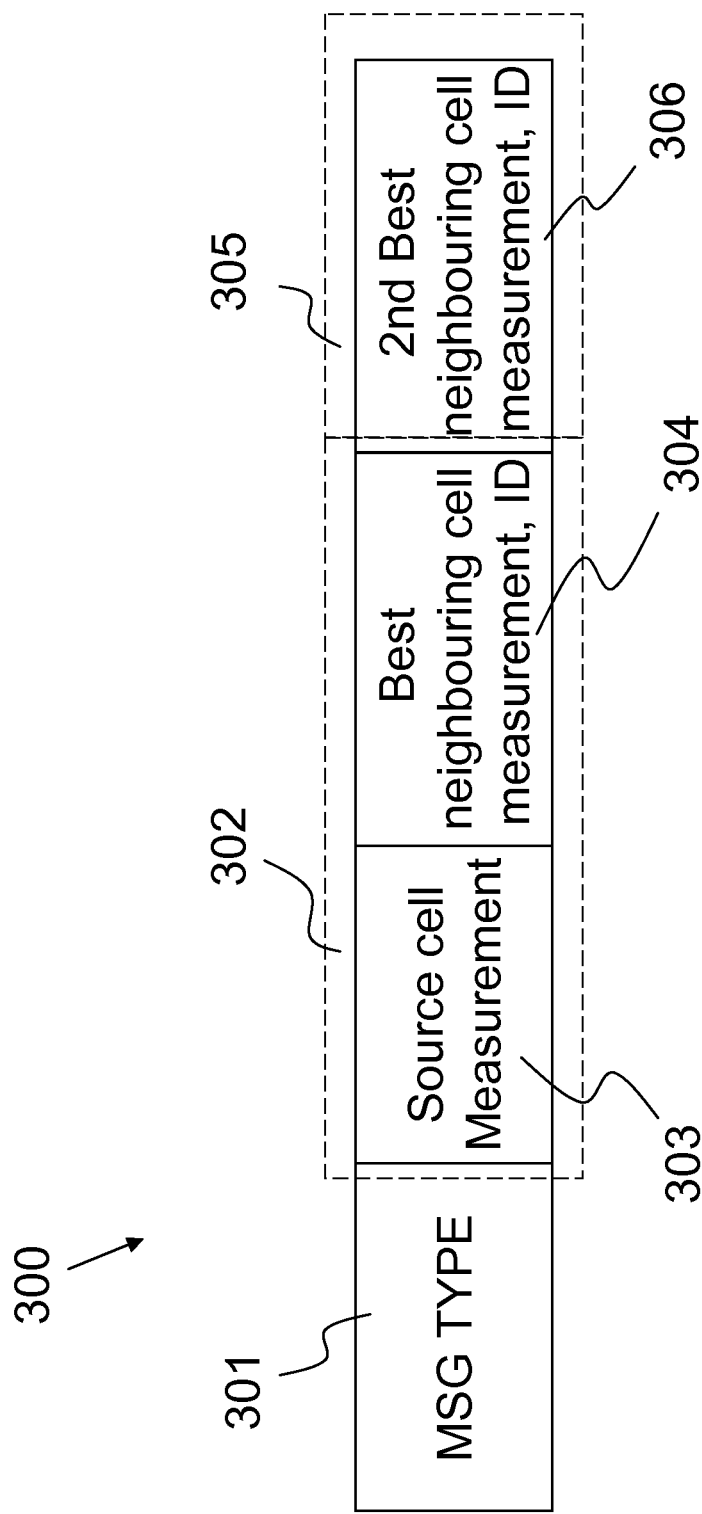
FIG. 3 is a schematic block diagram of a measurement report.

FIG. 3 discloses a general message format for a measurement report 300. The key information for the message is the measurement results for the source cell 11, and the neighbouring cell 17 with the strongest received signal power measurement. If the measurement results for both the source cell and the neighbouring cell can be transmitted as close to the message header as possible in a first part, it is possible to make a good HO decision only based on the received first several segments. In the illustrated example, the measurement report 300 comprises a header 301, in which for example, message (MSG) type is comprised. Directly after the header 301 is a first part 302 placed. The first part 302 comprises a source cell measurement 303 and a best neighbouring cell measurement and ID 304, also called neighbouring cell with the strongest received signal power. The first part may further comprise source cell ID and/or the source cell measurement 303 and the best neighbouring cell measurement and ID 304 may be placed relative one another in the other way around, that is, the best neighbouring cell measurement and ID 304 may be placed before the source cell measurement 303.

The measurement report 300 may further comprise a second part 305 comprising a 2nd best neighbouring cell measurement and ID 306. It should here be noted that there is typically much more measurements than from just two neighbouring cells.

The measurement report may then be divided into one or more segments, depending on the size of the radio allocation and the amount of channel coding used, and transmitted one segment at a time to the source radio base station 14. The header may be a part of the first segment. How large the first segment is depends on the channel, and not the content of the measurement report. It can either be large enough for the whole report, or maybe not big enough for the key information.

Embodiments herein define two related features

Put the key information elements at the beginning, the first sections, the first part, in the measurement report 300. For example, both the source cell 11 and the best neighbouring cell measurement results are transmitted close to the message header 301.

If urgent, make HO decision based on the received incomplete HO measurement report message.

If everything goes well in normal cases, the delay between the time instant when the measurement report 300 is transmitted at user equipment 13 and the time instant when the whole message is received at the radio base station 14 should be very small. So, if the determined delay is still less than the predefined time threshold value, the HO module may continue waiting for the rest of the segments, or else, execute the proposed delay efficient procedure.

Figure 4:
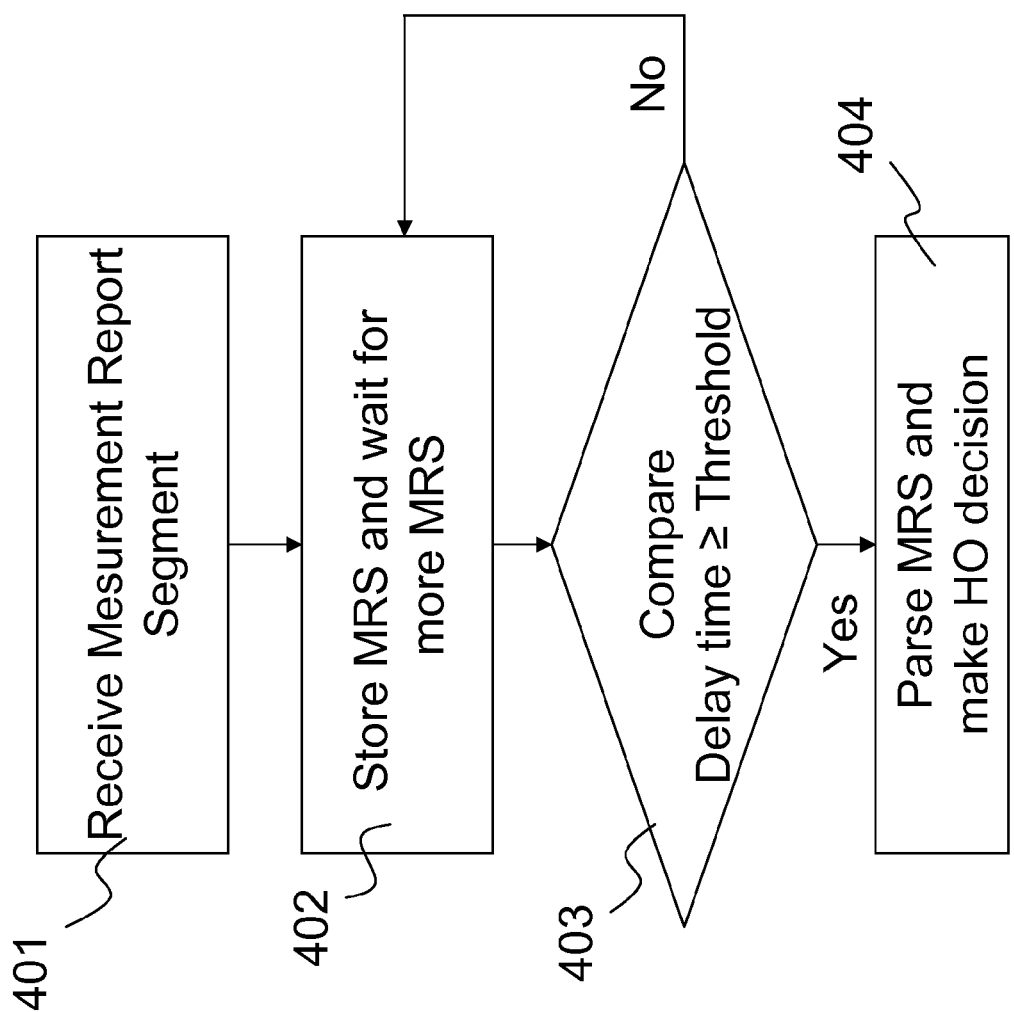
FIG. 4 is a schematic flow chart of a method in a source radio base station.

FIG. 4 shows a schematic flowchart of a method in the source radio base station 14 in the radio communications network 100.

In step 401 the source radio base station 14 receives a measurement report segment (MRS).

In step 402 the source radio base station 14 stores the measurement report segment and waits for further measurement report segments.

In step 403 the source radio base station determines whether it is urgent to determine handover or not. This is performed by comparing a determined transmission time, also called delay time, with a predefined time threshold value.

If the transmission time has reached or exceeded the time threshold value, indicated as 'Yes' in the figure, the source radio base station 14, in step 404, decodes and parses or analyses the measurement report segment or segments. Furthermore, the radio base station 14 checks if the received segments have enough information to perform a handover or not. Hence, the source radio base station 14 initiates a handover determination process.

However, if the transmission time has not reached or exceeded the time threshold value, indicated as 'No' in the figure, the source radio base station 14 returns to step 402 and waits on receiving more measurement report segments.

To decide whether or not it is urgent to trigger the proposed delay efficient HO processing, the time threshold value for the HO measurement message need to be predefined. As mentioned above, the time threshold value is used to measure the delay from the instant when the measurement report is triggered at user equipment 13, to the time instant when source radio base station receives the whole measurement report message. It may be set considering the hybrid Automatic Repeat-request (HARQ) round trip time (RTT), radio link control (RLC) RTT period, the number of maximum RLC retransmission attempts, and also the system process delay, for example, RRC message encode and decode delay at L1 and RRC message processing delay at higher layer.

Figure 5:
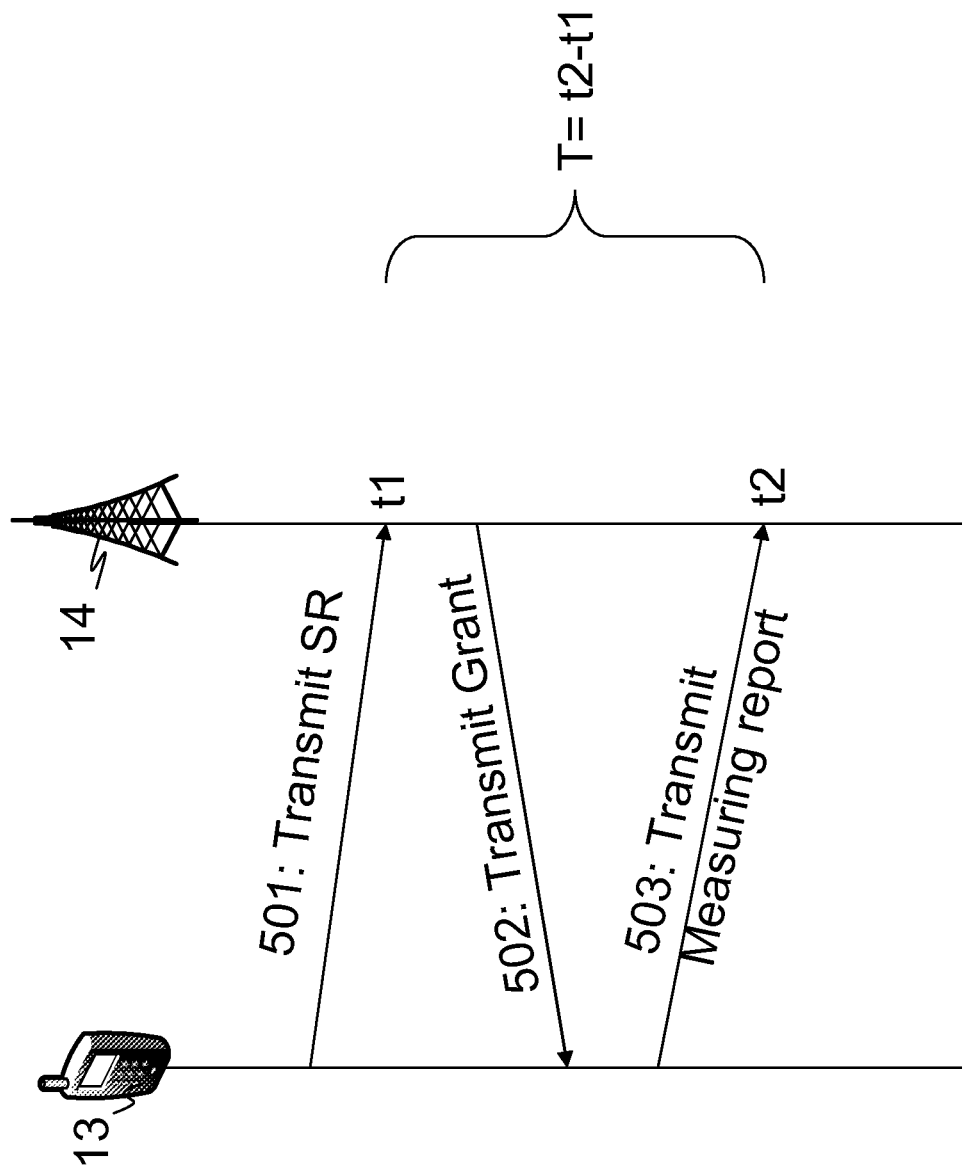
FIG. 5 is a schematic signalling scheme between a user equipment and a source radio base station.

FIG. 5 shows a schematic diagram of embodiments of determining a transmission time T for a transmission between the user equipment 13 and the source radio base station 14. When the first segment of the measurement report is received at a second time instant t2, as shown in FIG. 5, the HO module of the source radio base station 14 checks a first time instant t1 when the latest scheduling request was received. In some embodiments it is assumed that the last scheduling request is for the HO measurement report. This assumption is reasonable, because the HO signaling message has higher priority over the other traffic. If the transmission time $T=t2-t1$ exceeds the predefined time threshold value, it is the time to trigger the proposed delay efficient HO processing procedure.

In step 501, the user equipment 13 transmits a scheduling request, SR, to the source radio base station 14, which is received at the first time instant t1.

In step 502, the source radio base station 14 may transmit a grant of the scheduling request to the user equipment 13.

In step 503, the user equipment 13 transmits a measurement report to the source radio base station 14, which is received at the second time instant t2.

The transmission time T is determined by t2-t1.

This transmission time is then compared to a predetermined time threshold value.

If the transmission time has reached or exceeded the time threshold value, the source radio base station 14 checks if the received segments have enough information to perform a handover or not.

If the transmission time has not reached or exceeded the time threshold value, the source radio base station 14 returns and waits on receiving more measurement report segments.

Hence, the source radio base station decodes the received segments when the transmission time has expired, and it is decided to use the incomplete report.

Figure 6:
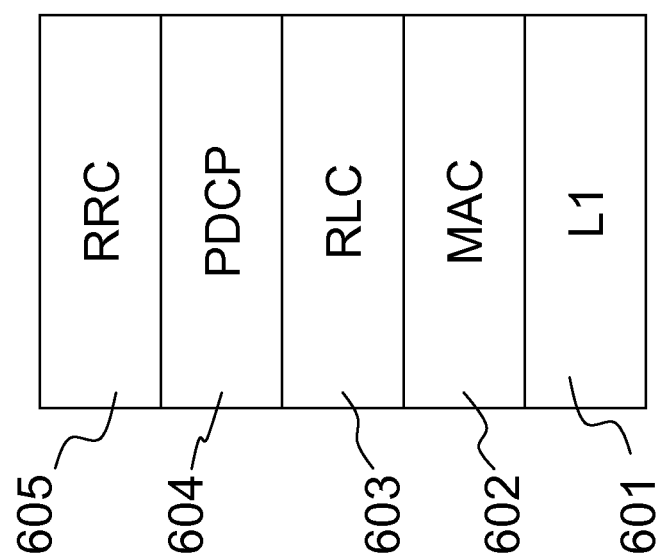
FIG. 6 is a schematic diagram depicting a protocol stack.

As defined in the 3GPP standard documents, three different signalling radio bearers (SRBs) are defined to carry RRC signaling messages: SRB0, SRB1 and SRB2. SRB0 is used for RRC messages carried over Common Control Channel (CCCH). This kind of signaling is the system broadcast information. SRB1 is mainly used for the RRC connection establishment/modification related RRC signaling messages. SRB2 is used to carry the Non-Access Stratum (NAS) signaling messages. So, SRBs can be ranked like: SRB1>SRB2>SRB0. SRB0 has no security requirements. But, SRB1 and SRB2 may have security requirements. Measurement reports should be delivered in the SRB1 Radio Access Bearer (RAB). This idea may also be used over a non-security based link. If security is however required, the security options including cipher and integrity check may be performed at PDCP layer. The protocol stack for the control plane is shown in FIG. 6.

The protocol stack comprises a first layer, L1, 601, the physical layer. Furthermore, the protocol stack comprises second layers represented by of an implementation of a medium access control (MAC) layer 602, a radio link control (RLC) layer 603 and a packet data convergence protocol (PDCP) layer 604. The packet data convergence, protocol (PDCP) layer 604 may perform services such as security, header compression, ciphering, and handoff. Security services may include ciphering to prevent others, e.g., attackers, from reading the transmitted messages and integrity protection, which prevents others from forging the identity of a user. Header compression services may compress headers of certain types of packets, e.g., IP headers, User Datagram Protocol (UDP) headers, and Real Time Protocol (RTP) headers. Hand off services may include in-order delivery and selective delivery services that may include re-transmission services. The radio link control (RLC) layer 603 may perform services, such, as segmentation, concatenation, re-assembly, re-transmission, and other services that ensure that the radio link is reliable. The medium access control (MAC), layer 602 may performs service, such as scheduling, building frames that are physically transported in the physical layer (PHY), and acknowledgement (ACK) and negative acknowledgement (NACK) services, such as hybrid Automatic Repeat-request (HARQ).

The LTE Layer 3 software comprises of a Radio Resource Control (RRC) protocol 605. The LTE RRC layer provides broadcast of system information; configures the RLC, MAC and PDCP layers; carries out mobility functions and Quality of Service management functions. Key features include: System information handling, Paging, Measurements and cell reselection, Handover, RRC security and integrity.

The integrity check is performed at PDCP layer 604. Both the PDCP packet data unit (PDU) header and the PDCP PDU is integrity protected. This means that the normal procedure will do the integrity check on the whole entity when the RRC message arrives at the receiver side. If no integrity check error occurs, the RRC message will be forwarded to the RRC layer 605 after the extraction of the PDCP header. Otherwise, a failure report indicating the observed error type will be reported to the RRC layer 605. To utilize the present solution, the following additional and optional designs are suggested:

- The integrity check is modified so that when it fails, both the received PDCP PDU parts need to be forwarded to the upper layer anyway; the received segment is delivered together with an indication that it is a segment of an RRC message that did not pass the integrity check.
- The integrity check is bypassed in some embodiments; for example, when HO measurement report messages are delivered in a coverage limited scenario.

The two embodiments are only applicable for the measurement report being a handover measurement report message.

Figure 7:
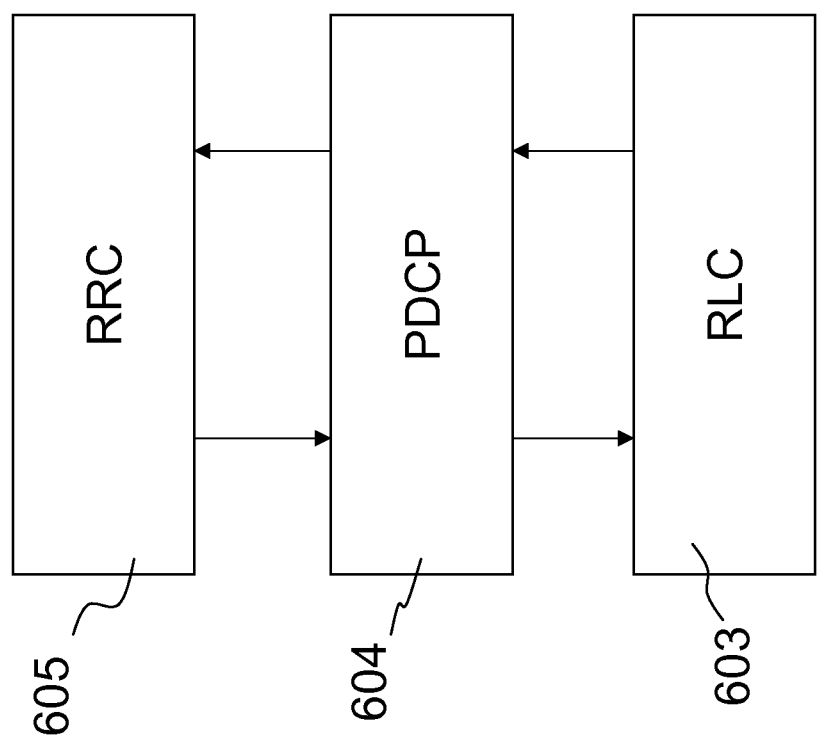
FIG. 7 is a schematic block diagram depicting communication between different layers in a protocol stack.

In FIG. 7 a schematic diagram depicting an example of cross talk between present protocol layers is disclosed. In coverage limited scenarios, measurement report may be segmented depending on the selected MAC transport format at RLC layer. To get the message segment delivered from RLC layer 603 to PDCP layer 604 and further to the RRC layer 605, some cross-layer work need be designed. In case the HO measurement is based on Reference Symbol Received Power (RSRP) values, the HO measurement report is triggered when the RSRP value from a neighbour cell is higher than that from the source cell 11 by a number of dBs equal to HO hysteresis. Also, this condition has to be satisfied for a period equal to the HO timer-to-trigger.

If considering the typical time to trigger, 480 ms, and hysteresis (1 dB) settings, a HO measurement report event will be triggered only if one of the neighbouring cells has, for example, 1 dB higher RSRP than the serving cell for 480 ms continuously. A predefined timer setting at RRC layer based on HO timer-to-trigger, may be for example, 480 ms. That means that the RRC layer will periodically, with a period of 480 ms, request the RLC layer to check whether there are any data segments waiting at the receiver side. If any, please forward these segments to PDCP layer. Because this idea targets the HO signaling message, only acknowledged mode based RLC segments will probably be delivered to PDCP layer.

For ciphering algorithms, Advanced Encryption Standard (AES) algorithm is one option. AES is an algorithm working with key sizes of 128 bits, 192 bits or 256 bits, and cipher data blocks with 16 bytes. It should be possible to decipher the message segment, larger than 16 bytes.

Embodiments herein disclose a way that is simple to use and improves HO performance. However, RRC signaling is transmitted with Packed encoding rules (PER) encoding, X.691. Each information element is encode and decoded independently. So, it is of course feasible to only parse the key information elements received at the first segments, and try to make HO decision. But, this may require the PER encoder/decoder to modify the processing flow. This may be implementation related. Using this solution, the key information elements of the measurement report is preferred to be put as close as possible to the message header.

Hence, the RRC layer could, with predefined intervals matching e.g. measurement report interval of 480 ms, request the RLC layer to check whether there are any data segments waiting, and if so, request them to be forwarded even though all segments of the RLC message might not have been received.

Figure 8:
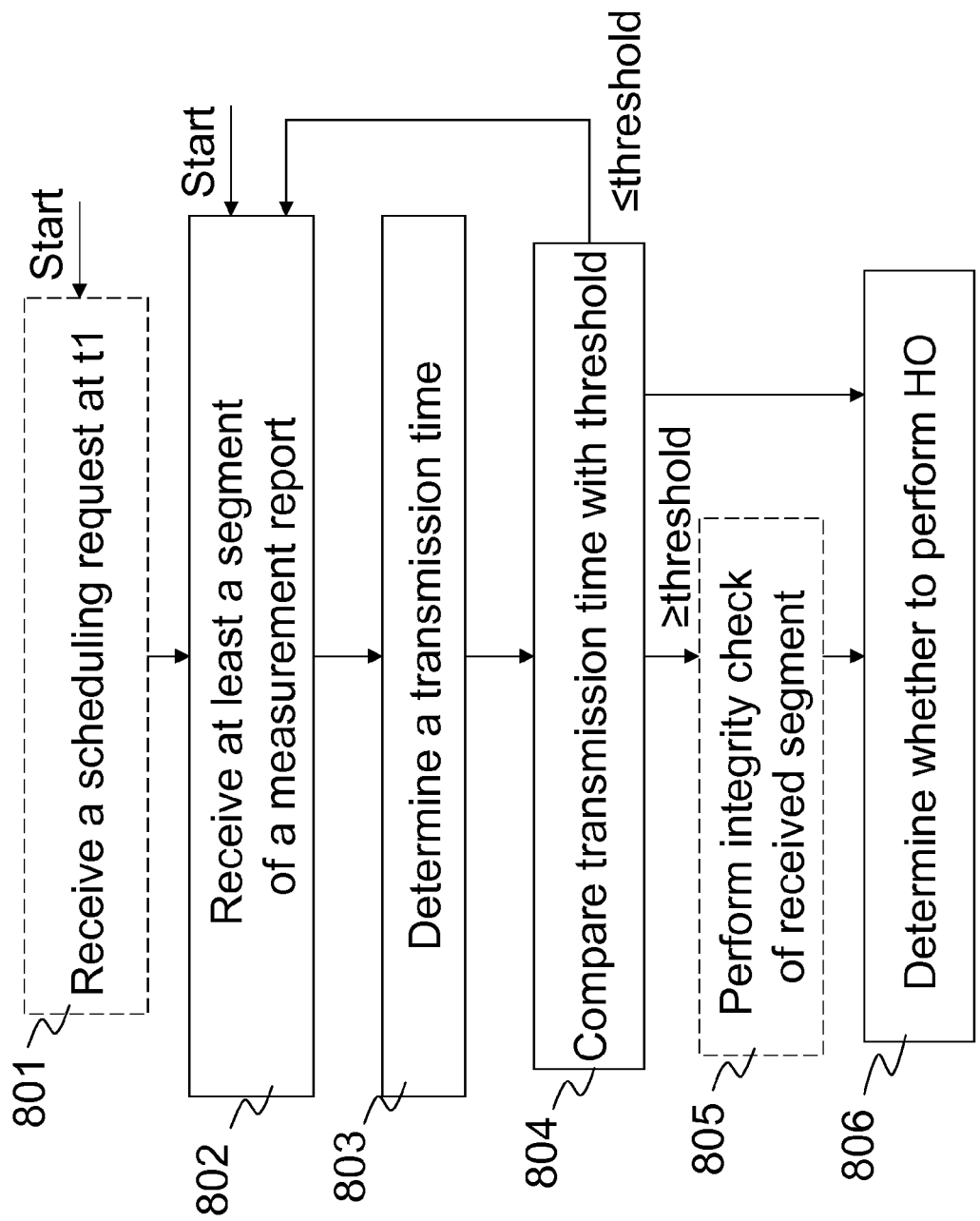
FIG. 8 is a schematic flow chart depicting a method in a source radio base station.

The method steps in the source radio base station 14 for enabling a handover of a connection to the user equipment 13 from the source cell 11 to the target cell 17 according to some embodiments will now be described with reference to a flowchart depicted in FIG. 8. The steps do not have to be taken in the order stated below, but may be taken in any suitable order. The source radio base station 14 serves the source cell 11 and is comprised in a radio communications network 100. The source cell 11 and the target cell 17 may be served by the source radio base station 14 or by different radio base stations.

Step 801

This is an optional step as indicated with the dashed line. The source radio base station 14 receives a scheduling request from the user equipment 13 at a first time indication t1.

Step 802

The source radio base station 14 receives at least a first segment of a measurement report from the user equipment 13, for example at a second time indication t2. The measurement report indicates received signal power of signals of neighbouring cells and the measurement report may be comprised in a radio resource control message.

Step 803

The source radio base station 14 determines a transmission time of the segment of the measurement report. For example, the source radio base station may determine a time interval between the first time indication t1 and the second time indication t2. Thus, measured as the interval between the most recent reception of a scheduling request from the UE, and the reception of the most recent segment of the measurement report. There are other ways to determine transmission times such as a time indication in the measurement report or the like.

Step 804

The source radio base station 14 compares the transmission time of the segment with a predefined time threshold value.

Step 805

This is an optional step as indicated with the dashed line. The radio base station 14 performs an integrity check on the received segments. For example, when the integrity check has failed, the radio base station forwards a received Packet Data Convergence Protocol Packet Data Unit part of the first segment to an upper layer of a protocol stack, and delivers the first segment together with an indication that the first segment comprises a segment of an Radio resource control message that failed the integrity check.

The integrity check may be bypassed.

Step 806

When the time interval has exceeded the time threshold value, the source radio base station determines whether to perform the handover based on the at least first segment of the measurement report.

It should be noted that when the transmission time has not exceeded the time threshold value, the radio base station may wait for additionally one second segment of the measurement report as indicated with the arrow denoted '≤threshold' in the figure.

The radio base station 14 may further request, at a predefined interval, a received segment at a media access control layer of a protocol stack to be delivered to a packet data convergence protocol layer of the protocol stack and further up to a radio resource control layer of the protocol stack. The received segment is then transmitted from the media access control layer to the packet data convergence protocol layer and further up to the radio resource control layer.

The measurement report may comprise a first part of the measurement report that is placed directly after a header in the measurement report. The first part comprises an identity of the target cell, a measured received signal power of a signal of the target cell, and a measured received signal power of a signal of the source cell. The first part is placed before a second part comprising a neighbouring cell identity with a weaker measured received signal power than the measured received signal power of a signal from the target cell.

Figure 9:
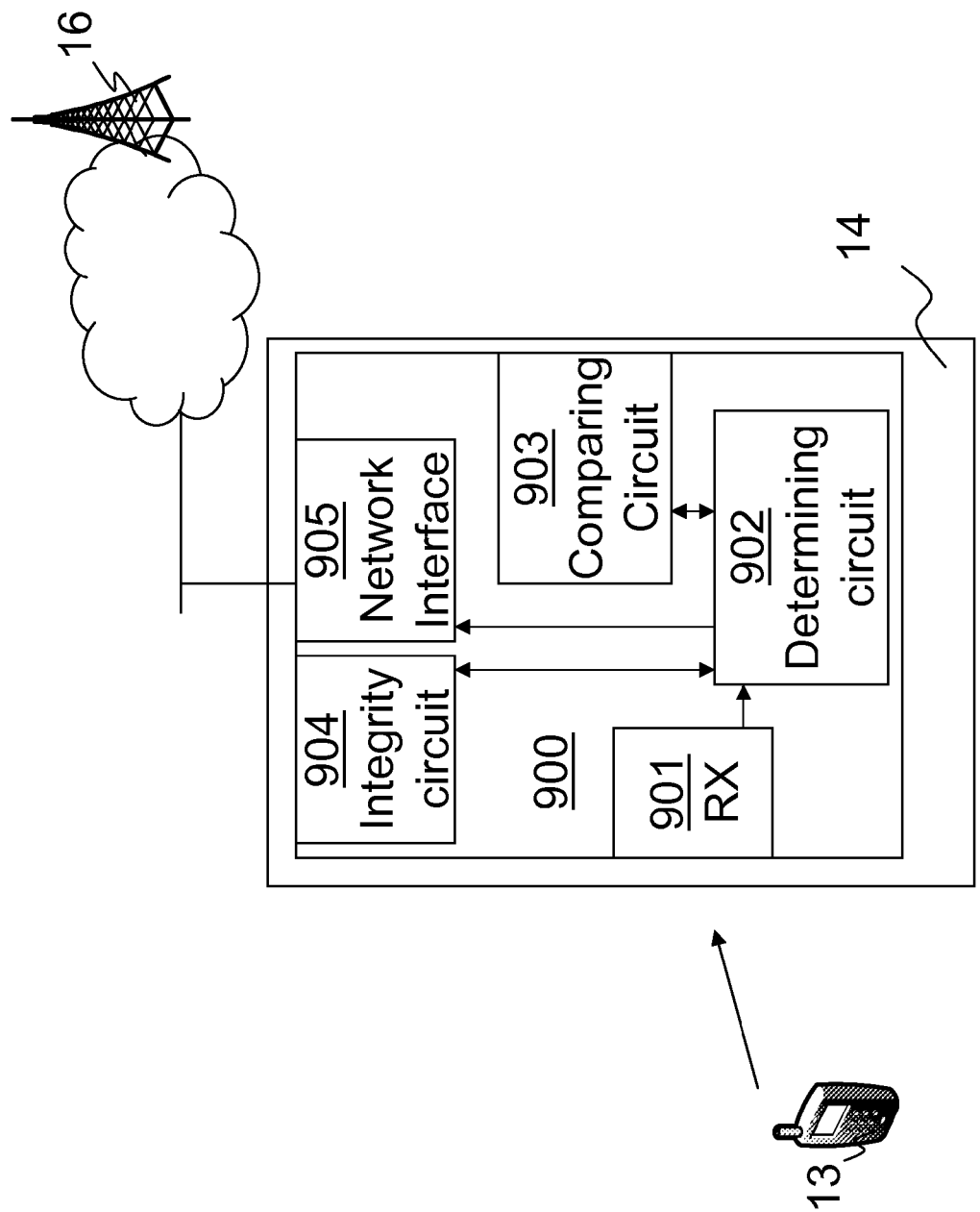
FIG. 9 is a schematic block diagram of a source radio base station.

In order to perform the method an arrangement 900 in a source radio base station 14 is provided. FIG. 9 shows a schematic block diagram of a source radio base station 14.

The arrangement 900 may comprise a receiving circuit (RX) 901 arranged to receive at least a first segment of a measurement report from the user equipment 13. The measurement report is arranged to indicate received signal power of signals of neighbouring cells and the measurement report may be comprised in a radio resource control message.

The arrangement 900 further comprises a determining circuit 902 arranged to determine a transmission time of the segment of the measurement report.

For example, the receiving circuit 901 may further be arranged to receive a scheduling request from the user equipment 13 at a first time indication t1. The transmission time is determined as the interval between the first time indication of the scheduling request from the UE, and a second time indication t2 of the reception of the most recent segment of the measurement report.

The arrangement 900 additionally comprises a comparing circuit 903 arranged to compare the transmission time of the segment with a predefined time threshold value.

The arrangement may further comprise an integrity circuit 904 arranged to perform an integrity check on the received segments. For example, when the integrity check has failed, the arrangement 900 forwards a received Packet Data Convergence Protocol Packet Data Unit part of the first segment to an upper layer of a protocol stack, and delivers the first segment together with an indication that the first segment comprises a segment of an Radio resource control message that failed the integrity check.

The integrity check may be bypassed.

When the time interval has exceeded the time threshold value, the determining circuit 902 is arranged to determine to perform the handover based on the at least first segment of the measurement report. To perform the handover a network interface 905 may be used to establish connection to a second radio base station.

It should be noted that when the transmission time has not exceeded the time threshold value, the radio base station waits for additionally one second segment of the measurement report.

The arrangement 900 may further request, at a predefined interval, a received segment at a media access control layer of a protocol stack to be delivered to a packet data convergence protocol layer of the protocol stack and further up to a radio resource control layer of the protocol stack. The received segment is then transmitted from the media access control layer to the packet data convergence protocol layer and further up to the radio resource control layer.

Figure 10:
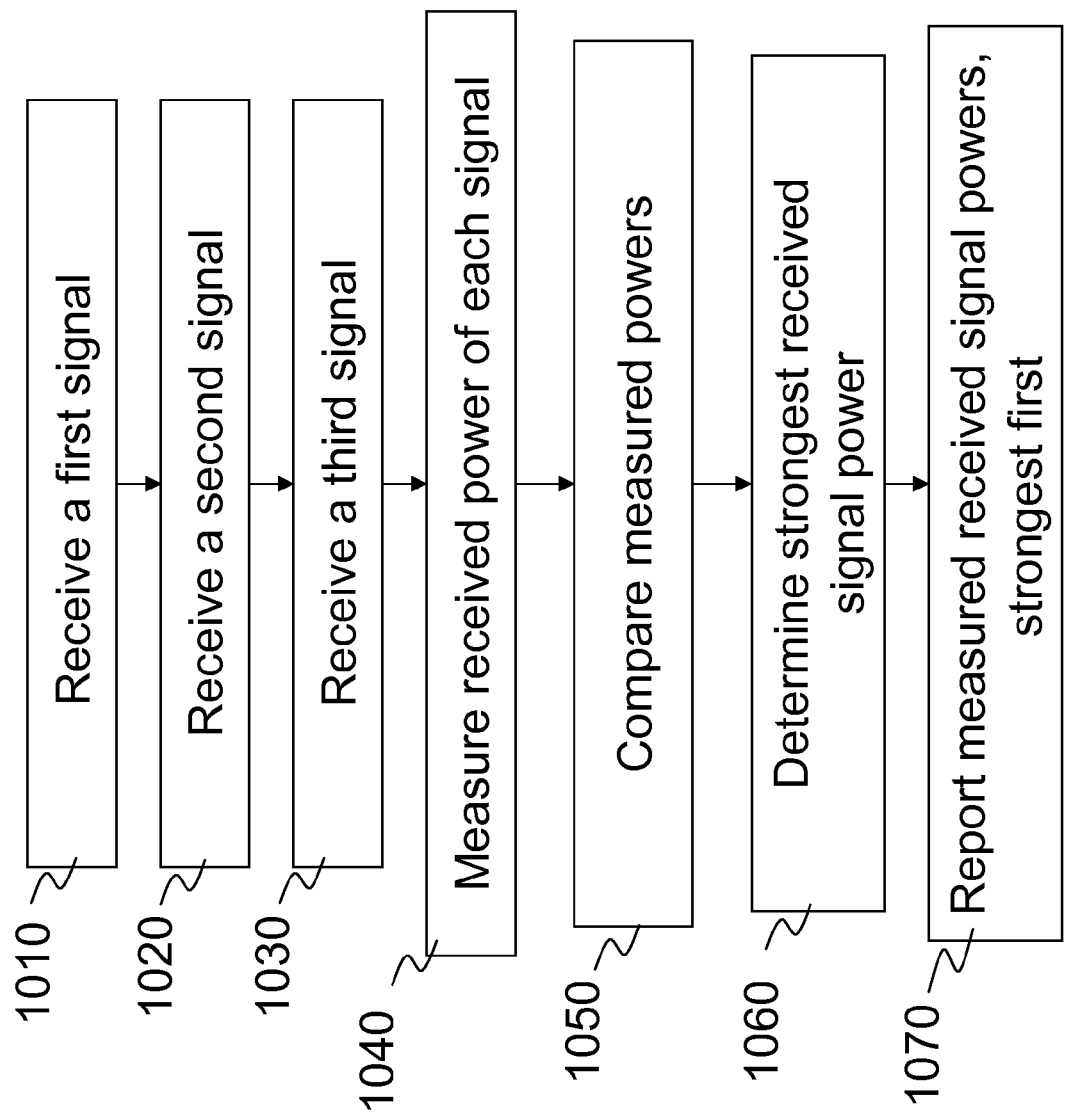
FIG. 10 is a schematic flow chart depicting embodiments of a method in user equipment.

The method steps in the user equipment 13 for enabling a handover of a connection to the user equipment 13 from the source cell 11 to the target cell 17 according to some embodiments will now be described with reference to a flowchart depicted in FIG. 10. The steps do not have to be taken in the order stated below, but may be taken in any suitable order. The source radio base station 14 serves the source cell 11 and is comprised in a radio communications network 100. The source cell 11 and the target cell 17 may be served by the source radio base station 14 or by different radio base stations.

Step 1010

The user equipment 13 receives a first signal of a first neighbouring cell 12, for example, from a first neighbouring radio base station 15.

Step 1020

The user equipment 13 receives a second signal of a second neighbouring cell 17, for example, from a second neighbouring radio base station 16. As indicated below these signals may be received from the same radio base station, different radio base stations, may, not very likely, also come from the source radio base station.

Step 1030

The user equipment 13 receives a third signal of the source cell 11 from the source radio base station 14.

Step 1040

The user equipment 13 measures a received signal power of the first signal and a received signal power of the second signal of the respective neighbouring cell and a received signal power of the third signal of the source cell 11. The measured received signal power of the second signal is stronger than the measured received signal power of the first signal.

Step 1050

The user equipment 13 compares the measured received signal power of the first signal with the measured received signal power of the second signal.

Step 1060

The user equipment 13 determines based on the comparison, that a strongest received signal power is represented by the measured received signal power of the second signal.

Step 1070

The user equipment 13 reports the measured received signal powers in a segmented measurement report to the source radio base station 14. The measurement report comprises a header and a first part placed directly after the header in the measurement report, which first part comprises the measured received signal power of the third signal, the determined strongest received signal power and an identity of the second neighbouring cell 17 of the strongest received signal power. The first part is placed before a second part, which second part comprises the first neighbouring cell identity 15 and the measured received signal power of the first signal.

The measurement report is to be used by the source radio base station 14 to determine whether the target cell is represented by the second neighbouring cell 17 and whether to perform a handover to the target cell.

The measurement report may be divided into one or more segments, depending on the size of the radio allocation and the amount of channel coding used, and transmitted one segment at a time to the source radio base station 14. The measurement report may comprise a Radio Resource Control message.

The first and second neighbouring cells 12,17 may be controlled by a first neighbouring radio base station 15 and a second radio base station 16, respectively, and the first and second signal is sent from respective radio base station. In some embodiments, the first and second neighbouring cells 12,17 are controlled by one and the same neighbouring radio base station and the first and second signal is sent from the one and the same neighbouring radio base station.

It should also be noted that all three cells may be controlled by one and the same or different radio base stations.

Figure 11:
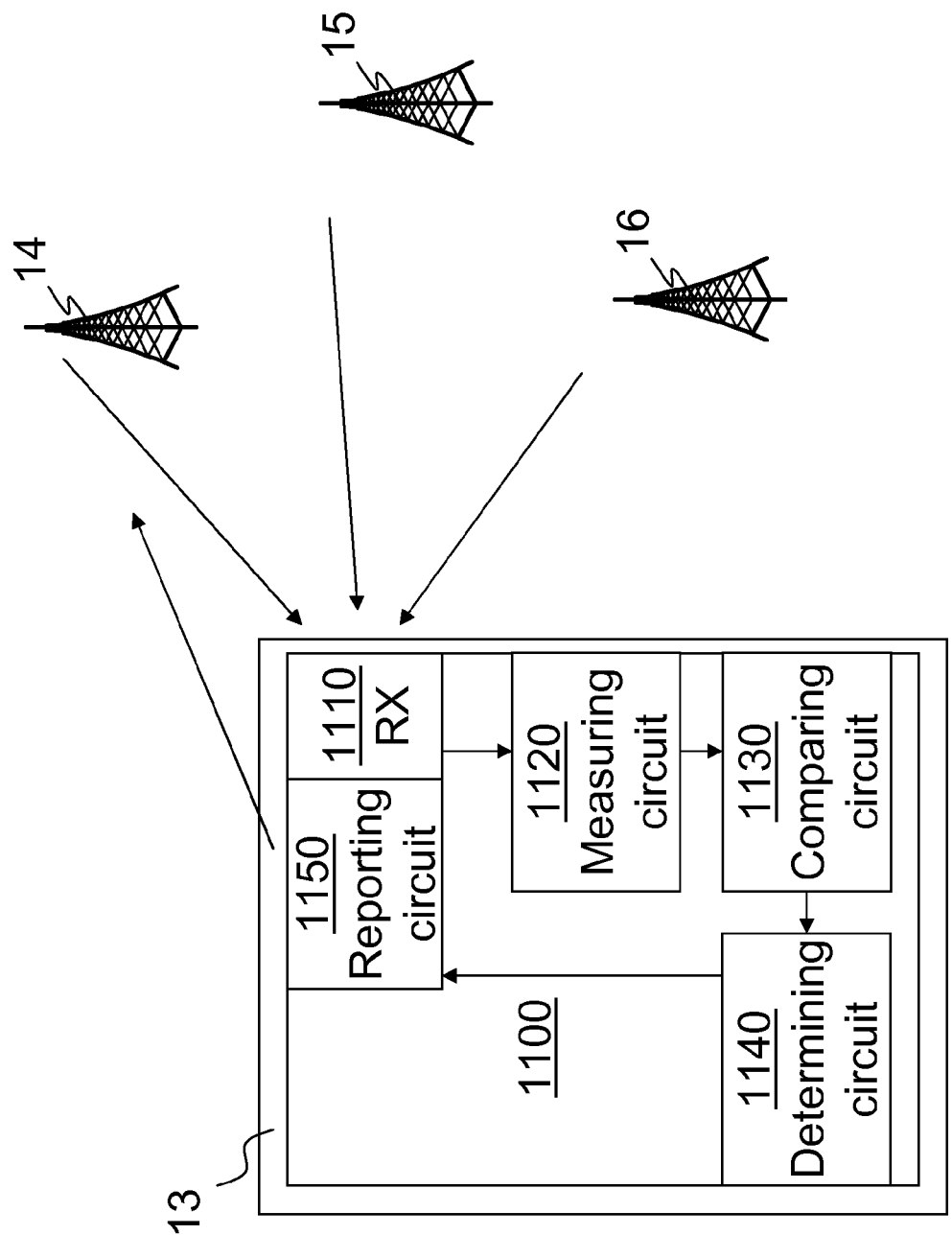
FIG. 11 is a schematic block diagram of a user equipment.

In order to perform the method an arrangement 1100 in a source radio base station 14 is provided. FIG. 11 shows a schematic block diagram of a source radio base station 14.

The arrangement 1100 may comprise a receiving circuit (RX) 1110 arranged to receive a first signal of a first neighbouring cell 12, a second signal of a second neighbouring cell 17, and a third signal of the source cell 11, the third signal coming from the source radio base station 14.

The arrangement 1100 further comprises a measuring circuit 1120 arranged to measure a received signal power of the first signal and a received signal power of the second signal of the respective neighbouring cell and a received signal power of the third signal of the source cell 11. The measured received signal power of the second signal is stronger than the measured received signal power of the first signal.

The arrangement 1100 further comprises a comparing circuit 1130 arranged to compare the measured received signal power of the first signal with the measured received signal power of the second signal.

The arrangement 1100 further comprises a determining circuit 1140 arranged to determine, based on the comparison, that a strongest received signal power is represented by the measured received signal power of the second signal.

The arrangement 1100 further comprises a reporting circuit 1150 arranged to report the measured received signal powers in a segmented measurement report to the source radio base station 14. The measurement report comprises a header and a first part placed directly after the header in the measurement report, which first part comprises the measured received signal power of the third signal, the determined strongest received signal power and an identity of the second neighbouring cell 17 of the strongest received signal power. The first part is placed before a second part, which second part comprises the first neighbouring cell identity 15 and the measured received signal power of the first signal. The measurement report is to be used by the source radio base station 14 to determine whether the target cell is represented by the second neighbouring cell 17 and whether to perform a handover to the target cell.

In the drawings and specification, there have been disclosed exemplary embodiments of the invention. However, many variations and modifications may be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a source radio base station for enabling a handover of a connection to a user equipment from a source cell to a target cell, wherein the source radio base station serves the source cell and is included in a radio communications network, and wherein the method comprises:
   receiving at least a first segment of a measurement report from the user equipment, which measurement report indicates received signal power of signals of neighboring cells;
   determining a transmission time for the at least first segment of the measurement report;
   comparing the transmission time with a predefined time threshold value; and
   when the transmission time has exceeded the time threshold value, determining whether to perform the handover, based on the at least first segment of the measurement report and without waiting for any further segments of the measurement report.

2. The method of claim 1, further comprising, when the transmission time has not exceeded the time threshold value, waiting for at least one second segment of the measurement report.

3. The method of claim 2, further comprising performing an integrity check on at least one of the received first and second segments.

4. The method of claim 3, further comprising in response to the integrity check failing:
   forwarding a received Packet Data Convergence Protocol Packet Data Unit part of the at least first segment to an upper layer of a protocol stack; and
   delivering the at least first segment together with an indication that the at least first segment comprises a segment of a Radio resource control message that failed the integrity check.

5. The method of claim 1, wherein the measurement report is comprised in a radio resource control message.

6. The method of claim 1, further comprising receiving a scheduling request from the user equipment at a first time indication, wherein the transmission time is measured as the interval between the first time indication of the scheduling request from the user equipment, and a second time indication of the reception of the most recent segment of the measurement report.

7. The method of claim 1, wherein an integrity check of the received segments of the measurement report is bypassed.

8. The method of claim 1, wherein a first part of the measurement report is placed directly after a header in the measurement report and which first part comprises an identity of the target cell, a measured received signal power of a signal of the target cell, and a measured received signal power of a signal of the source cell, wherein the first part is placed before a second part comprising a neighboring cell identity with a weaker measured received signal power than the measured received signal power of a signal from the target cell.

9. The method of claim 1, wherein receiving at least the first segment of the measurement report further comprises:
   requesting, at a predefined interval, a received segment at a media access control layer of a protocol stack to be delivered to a packet data convergence protocol layer of the protocol stack and further up to a radio resource control layer of the protocol stack; and
   transmitting the received segment from the media access control layer to the packet data convergence protocol layer and further up to the radio resource control layer.

10. The method of claim 1, wherein the source cell and the target cell are served by the source radio base station or by different radio base stations.

11. An arrangement in a source radio base station for enabling a handover of a connection to a user equipment from a source cell to a target cell, wherein the source radio base station serves the source cell and is comprised in a radio communications network, and wherein the arrangement comprises:
   a receiving circuit configured to receive at least a first segment of a measurement report from the user equipment, which measurement report indicates received signal power of signals of neighboring cells;
   a determining circuit configured to determine a transmission time for the at least first segment of the measurement report;

a comparing circuit configured to compare the transmission time for the at least first segment with a predefined time threshold value; and wherein when the time interval has exceeded the time threshold value, the determining circuit is configured to determine whether to perform the handover based on the at least first segment of the measurement report and without waiting for any further segments of the measurement report.

\* \* \* \* \*